May 20, 1924.                                            1,495,011
E. H. FORD
COMBINED METER SETTING AND SUPPORT
Filed June 30, 1922
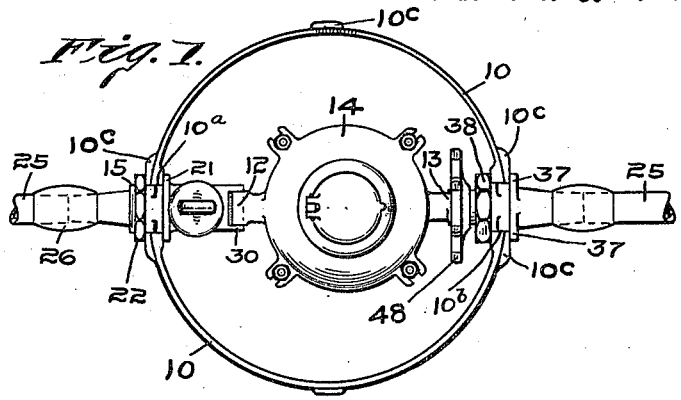
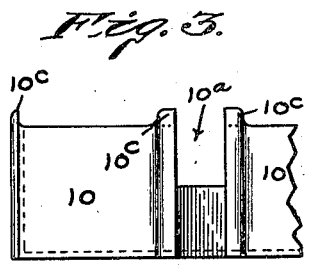
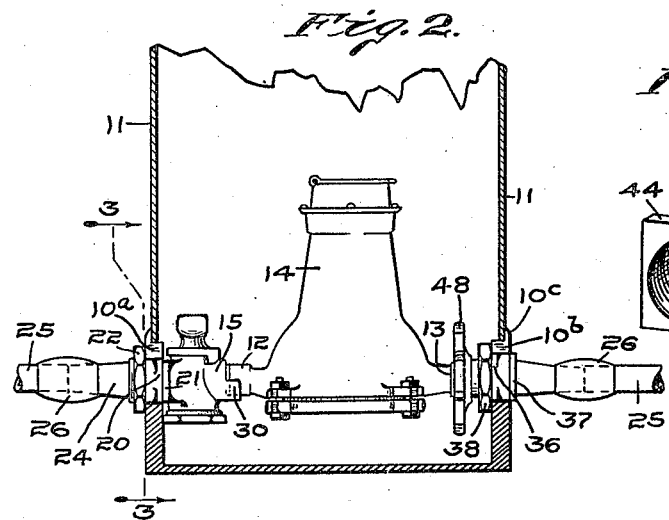
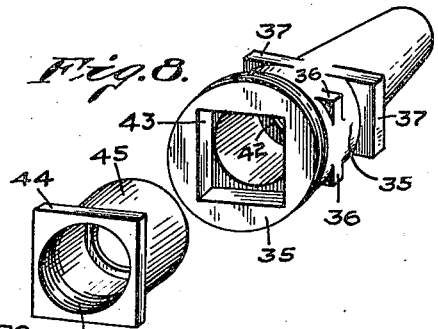
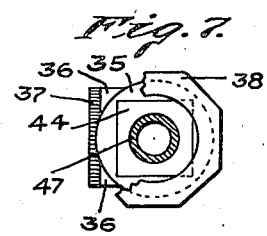
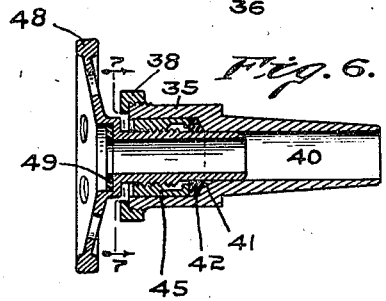
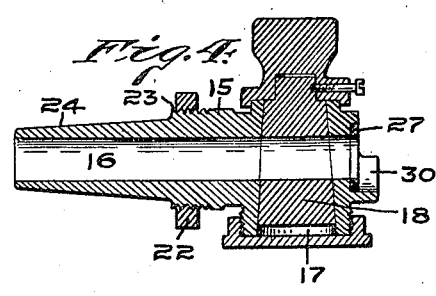
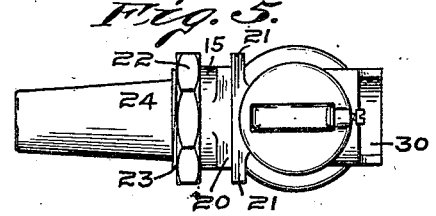
INVENTOR:
EDWIN H. FORD,
By Frank W. Woerner
ATTORNEY.

Patented May 20, 1924.

1,495,011

UNITED STATES PATENT OFFICE.

EDWIN H. FORD, OF WABASH, INDIANA, ASSIGNOR TO FORD METER BOX COMPANY, OF WABASH, INDIANA, A CORPORATION.

COMBINED METER SETTING AND SUPPORT.

Application filed June 30, 1922. Serial No. 572,031.

*To all whom it may concern:*

Be it known that I, EDWIN H. FORD, a citizen of the United States, residing at Wabash, in the county of Wabash and State of Indiana, have invented certain new and useful Improvements in Combined Meter Settings and Supports, of which the following is a specification.

This invention relates to a meter setting comprising meter coupling devices and their support, to resist leakage and to permit the introduction and removal of a meter, for measuring the passage of water, gas and like fluids, through service pipes.

One of the objects of the invention consists in the provision of a meter setting, which comprises couplings and their supports, whereby meters, for measuring the passage of water, gas and like fluids, can be easily removed from the service pipes for inspection, repair and replacement.

Another object of the invention consists in combining and utilizing a rigid and non-yielding wall of a base of a meter box to mount and rigidly support the meter coupling devices so as to hold them in determined relation and against spreading when pressure is applied for clamping the meter, per se, in operative position within the line of service pipe.

A still further object of the invention consists in the provision of a non-yielding meter box base for the mounting and the rigid supporting of the meter coupling devices, which clampingly hold the meter in operative position, which are simple in construction and efficient in operation.

I accomplish the above objects of the invention, and such others as may appear from a perusal of the following description and claims, by means of the construction illustrated in the accompanying drawings, forming a part hereof, in which—

Figure 1 is a top or plan view of a rigid and non-yieldable meter box base, showing the meter coupling devices occupying rigid operative positions therein. Fig. 2 is a side elevation of the meter coupling devices, with the meter box base shown in section. Fig. 3 is a fragmentary detail elevation of the meter box base, on the plane 3—3 in Fig. 2. Fig. 4 is a longitudinal section, on an enlarged scale, of one of the meter coupling devices for supporting one side of a meter and includes a cut off valve. Fig. 5 is a top or plan view of the coupling device shown in Fig. 4. Fig. 6 is a longitudinal section of the coupling device for supporting and clamping the other side of the meter in operative position. Fig. 7 is a view partly in section and partly in elevation, on the plane 7—7 in Fig. 6. Fig. 8 is a perspective view of a number of the parts of the clamping device shown in Figs. 6 and 7.

The combination shown in the drawings consists, essentially, of a rigid, or non-yieldable, meter box base, and meter coupling devices which are held in determined positions relatively to one another by said base.

Referring to the drawings, 10 represents a base of a meter box, which may be employed alone if the meter is placed in a cellar or similar place, the upper sections 11 being conjoined when the meter is placed into the ground, to exclude sand, gravel, earth or other foreign substances. Base 10 is generally provided with a bottom for the purpose of excluding foreign matter. The wall of base 10 is provided with the opposite recesses $10^a$ and $10^b$ to receive and hold against spreading the coupling devices by which proper connections are made with the spuds 12 and 13 of a conventional type of meter 14. Base 10 is also provided with a plurality of lugs $10^c$ which project upwardly from the rim of the wall to form stops for positioning and for preventing lateral displacement of the heretofore mentioned upper sections 11.

The coupling devices by which connections are made with spuds 12 and 13 of the meter 14 comprise at one side a barrel 15 having a longitudinal passageway 16 to afford a passage for the fluid to be measured. The barrel 15 on its inner end is enlarged to provide the necessary stock for the formation of a transverse cone-shaped opening 17 into which a correspondingly shaped valve 18 is fitted by which the flow of fluids may be discontinued when it is desired to install or remove meter 14. Barrel 15 of the coupling device has a square external formation in cross section, as at 20, best shown in Fig. 5, and the diameter of the square portion coincides with the width of recess $10^a$ in base 10, so that when barrel 15 rests within said recess the barrel is held against movement of rotation. Longitudinal displacement of the barrel 15 from recess $10^a$ is prevented in one direction by the laterally extending flanges 21 (Fig. 5), bearing against the inner surface of base 10 and movement of barrel 15 in the opposite direction is prevented by a threaded ring 22 which engages the threads 23 on the external surface of barrel 15, and bears against the outer surface of base 10. By means of this construction ring 22 may be tightly impinged against the external surface of base 10 and prevent accidental displacement of the coupling device from recess 10ª. The outer end portion of barrel 15 may be tapered as shown at 24 so that its reduced end corresponds to the diameter of the service pipe 25, and to which it may be connected by a suitable union, well known in the art, or by means of a wiped joint shown at 26. The inner end of barrel 15 is recessed to provide a seat for a gasket 27 against which the end of the meter spud 12 abuts, and the barrel 15 is further provided on its inner end with a projecting lip 30 to not only enable the end of adjacent meter spud 12 to be easily alined with barrel 15, but to support the meter 14 and thus relieve gasket 27 from lateral stress.

The coupling device for connecting the meter spud 13 comprises a barrel 35 which is tapered at its outer end, similarly to the barrel 15, so that it can likewise be connected to the service pipe 25. The external surface of barrel 35 is made square at one point, as at 36, (Fig. 8), and the diameter of this squared portion coincides to the width of recess 10ᵇ in base 10, so as to hold barrel 35 against movement of rotation. Barrel 35, similar to barrel 15, is held against longitudinal movement in one direction by means of the laterally projecting flanges 37 (Fig. 8), bearing against the external surface of base 10, and in the other direction by means of a collar 38 which is threaded upon the inner end of barrel 35, and bears against the internal surface of base 10. Barrel 35 is provided with a longitudinal passageway 40 for the passage of the fluid, and beginning at the inner end and extending into the barrel 35 passageway 40 is enlarged to provide an annular shoulder 41 to form a set for a gasket 42. See Fig. 6. A part of the enlarged portion of passageway 40 is made square, as at 43, which square opening is adapted to receive a correspondingly shaped square end 44 of a sleeve 45, so that the sleeve is held against movement of rotation within barrel 35. The thickness of square head 44 is somewhat less than the depth of the square opening 43, so that sleeve 45 has a limited amount of longitudinal movement independently of barrel 35, the object of which will be hereinafter more particularly described, but the accidental displacement of sleeve 45 from barrel 35 is prevented by means of the collar 38. See Figs. 6 and 7. When sleeve 45 occupies operative position one end is impressed against gasket 42 to prevent leakage between the parts at this point. Sleeve 45 is also provided with internal threads 46 which engage corresponding threads on the external surface of a revoluble cylinder 47 projected into passageway 40, of barrel 35, and the inner exposed end of cylinder 47 may be provided with a square head to which a wrench may be applied, or a handwheel 48 as shown, through which movement of rotation may be imparted for extending and retracting the cylinder and thereby respectively clamp or release meter 14 from operative position in service line 25. The inner end of barrel 35 is also provided with a recess to form a seat for a gasket 49 which is impressed against the adjacent meter-spud 13 when the barrel 35 is extended. It will readily be observed that when cylinder 47 is extended so as to impress gasket 49 against meter spud 13, the resistance set up in opposing this driving action of the cylinder 47 moves sleeve 45 longitudinally and independently of barrel 35, which results in more tightly impinging the end of sleeve 45 against gasket 42, thereby more effectually preventing leakage between the metal parts at the seat of the gasket.

With the preceding disclosure of my invention as a guide it will be easy for those skilled in this art to design other forms of coupling devices for meter setting purposes—to meet particular requirements of use—which will present all of the functional and result attaining characteristics and advantages of my meter setting device.

Having thus fully described my said invention, what I desire to secure by Letters Patent, is—

1. In a meter setting, the combination, with a rigid base having a plurality of recesses therein, of a plurality of meter coupling devices arranged at different points on said base and fitted within said recesses, one of said devices being extensible for increasing and decreasing the distance between the meter-coupling ends of the devices.

2. In a meter setting, the combination, with a rigid upwardly flanged non-yielding support, of a plurality of meter coupling devices removably mounted to extend through the rigid support, one of said devices being extensible for increasing and decreasing the distance between the meter-coupling ends of said devices and means on said coupling devices cooperating with the flanged portions of the support to prevent longitudinal and rotative movement of the coupling devices relative to the support.

3. In a meter setting, the combination, with a rigid support having flanged portions provided with a plurality of recesses, of a plurality of meter coupling devices removably mounted in the recessed portions of said rigid support, means cooperating with the recesses for securing each of said devices against rotative displacement, a shut off valve carried by one of said devices, the other being extensible for increasing and decreasing the distance between meter-coupling ends of the devices.

4. In a meter setting, the combination, with a rigid support having a plurality of recesses formed with straight sides, of meter coupling devices operatively arranged in said recesses, and provided with squared portions for preventing movement of rotation of said devices within the recesses, one of said devices being extensible for increasing and decreasing the distance between the meter-coupling ends of the devices.

5. In a meter setting, the combination, with a rigid support formed with a flanged portion having a plurality of straight sided recesses extending downwardly from the peripheral edge of said flanged portion, of meter coupling devices operatively arranged in said recesses, means on said devices for contacting with the straight sides of the recesses for preventing movement of rotation of said devices within the recesses, means engaging the outer walls of the flanged portion of the support to prevent accidental displacement of the devices from the recesses, one of said devices being extensible for increasing and decreasing the distance between the meter-coupling ends of the devices.

6. In a meter setting, the combination, with a non-yieldable support, of a pair of independently formed meter coupling devices held a fixed distance apart by said support, one of said coupling devices comprising a barrel provided with an internal passageway, the other coupling device comprising a barrel having an internal passageway, an internal shoulder formed in the passageway of the last barrel, a sleeve arranged in the passageway of the last barrel, means to prevent accidental displacement of the sleeve from its associated passageway, and a revoluble externally threaded cylinder extending into the hollow portion of the sleeve, whereby the resistance met in extending the cylinder effectually impinges the end of the latter against the internal shoulder.

7. In a meter setting, the combination, with a rigid meter box base surrounding the lower end of the meter, of a pair of independently formed meter coupling devices supported a fixed distance apart by the base, one of said coupling devices intersecting the base and being extensible for increasing and decreasing the distance between the meter-coupling ends of the devices.

8. In a meter setting, the combination, with a rigid meter box base, of a pair of independently formed meter coupling devices held a fixed distance apart by the base, one of said coupling devices comprising a barrel having an internal passageway, an internal shoulder formed in the internal passageway, an independent sleeve arranged within in the passageway, means to hold the sleeve against movement of rotation, and a revoluble externally threaded cylinder extending into the hollow portion and engaging internal threads in the sleeve, whereby the resistance met in extending the cylinder effectually impinges the end of the sleeve against the internal shoulder.

9. In a meter setting, the combination, with a rigid meter box base, of a pair of independently formed meter coupling devices held a fixed distance apart by the base, one of said coupling devices comprising a barrel having an internal passageway, the other coupling device comprising a barrel having an internal passageway, an internal shoulder formed in the passageway of the last barrel, an independent sleeve arranged within the passageway of the last barrel, means to hold the sleeve against movement of rotation, means to prevent accidental displacement of the sleeve from its associated passageway, and a revoluble externally threaded cylinder extending into the hollow portion and engaging internal threads in the sleeve, whereby the resistance met in extending the cylinder effectually impinges the end of the sleeve against the internal shoulder.

10. In a meter setting, the combination, with a non-yieldable meter box base, of a meter coupling device supported by said base which comprises a barrel having an internal passageway, a shoulder formed in the passageway of the barrel, a non-rotative longitudinally movable sleeve having internal threads arranged in the hollow portion of the barrel, and a revoluble cylinder having external threads to engage the internal threads in the sleeve.

11. In a meter setting, the combination, with a rigid non-yieldable meter box base, of a meter coupling device supported by the base which comprises a barrel having an internal passageway, a shoulder formed in the passageway of the barrel, a non-rotative longitudinally movable sleeve provided with internal threads arranged in the hollow portion of the barrel, means to prevent accidental displacement of the sleeve from the barrel, and a revoluble cylinder having external threads to engage the internal threads in the sleeve.

12. In a meter setting, the combination, with a rigid meter box base, of a meter coupling device rigidly supported on said base which comprises a barrel having an internal passageway, means to prevent accidental displacement of the device from its support, a shoulder formed in the passageway of the barrel, a non-rotative longitudinally movable sleeve provided with internal threads arranged in the hollow portion of the barrel, means to prevent accidental displacement of the sleeve from the barrel, and a revoluble cylinder having external threads to engage the internal threads in the sleeve.

13. In a meter setting, the combination, with a rigid meter box base, of a meter coupling device rigidly supported by said base which comprises a barrel having an internal passageway, of which a part is square in cross section, a shoulder formed in the passageway, a sleeve having a square end to rest in the square portion of the passageway and having longitudinal movement independently of the barrel, means to prevent accidental displacement of the sleeve from the barrel, and a revoluble cylinder threaded into the threaded opening in the sleeve.

14. In a meter setting, the combination, with a rigid meter box base having a recess, of a meter coupling device comprising a barrel with external vertical side walls to fit said recess, and having an internal passageway of which a part is square in cross section, means to prevent vertical and longitudinal displacement of the barrel from the recess, a shoulder formed in hollow portion of the barrel, a sleeve having a square end to rest in the square portion of the internal passageway and having longitudinal movement independently of the barrel, means to prevent accidental displacement of the sleeve from the barrel, and a revoluble cylinder threaded into the threaded opening in the sleeve.

In witness whereof, I have hereunto set my hand and seal at Wabash, Indiana, this 19th day of June, A. D., one thousand nine hundred and twenty-two.

EDWIN H. FORD. [L. S.]